SORTER SYSTEM

Filed July 2, 1963

2 Sheets-Sheet 1

INVENTOR
THEODORE C. COX
BY Joseph J. Connerton
ATTORNEY

United States Patent Office 3,274,563

Patented Sept. 20, 1966

3,274,563

SORTER SYSTEM

Theodore C. Cox, Rhinebeck, N.Y., assignor to International Business Machines Corporation, New York, N.Y., a corporation of New York Filed July 2, 1963, Ser. No. 292,241

5 Claims. (Cl. 340—172.5)

This invention is directed to information handling apparatus and more particularly to apparatus for sorting groups of discrete groups of information or words in a record or file, where each such word may have any one of a number of ordered values, which values differ from each other by increments within upper and lower limits. The apparatus is particularly adapted for sorting words serially issuing in random order of value from a generator. Each word consists of a fixed number of ordered binary bits, and any bit in each word is assigned the conventional binary value 0 or 1 in accordance with the value of its word with respect to all other words in the record. The order of the system may be of numerical, alphabetical or other desired characteristic.

In the past sorters capable of placing words of the above-described characteristics in order sequence have employed mechanical and electrical apparatus. For example, a mechanical sorter of the so-called pigeon-hole type having an intermediate storage facility to store an entire word in one of a number of ordered and addressable elements or slots is commonly known and understood. In such apparatus, each incoming word is addressed (selectively admitted) to the slot which is reserved to words of that value. After a storage operation has been carried out, the contents of the slots are serially retrieved or read in sequential order into a final record.

Another example of sorters is the type which compares the values of each pair of adjacent words as the word pairs issue serially from the generator, and which stores the words of each pair in a selected first or second intermediate storage area in accordance with the outcome of the comparison test. Later-occurring comparisons performed on words in intermediate storage ultimately result in arrangement of the words in serial order of value in a final record. An example of a sorter of this last-named type is found in U.S. Patent No. 2,974,306 to Femmer et al. and assigned to the same assignee as the present patent application. While sorters of the above-described types are both useful and satisfactory, both have the common disadvantage of requiring an intermediate storage facility sufficient to store the value of all words in the original record, whether these intermediate facilities are of a mechanical or electrical nature.

Accordingly, it is an object of the present invention to provide an improved sorter.

Another object of this invention is to provide a new and improved sorter having intermediate storage facilities of reduced capacity in comparison to that required in conventional sorters.

Another object of the invention is to provide a sorter employing a relatively simple, high-speed intermediate storage facility.

The foregoing and other objects, features and advantages of the invention will be apparent from the following more particular description of the preferred embodiment of the invention, as illustrated in the accompanying drawings, wherein.

Figure 1:
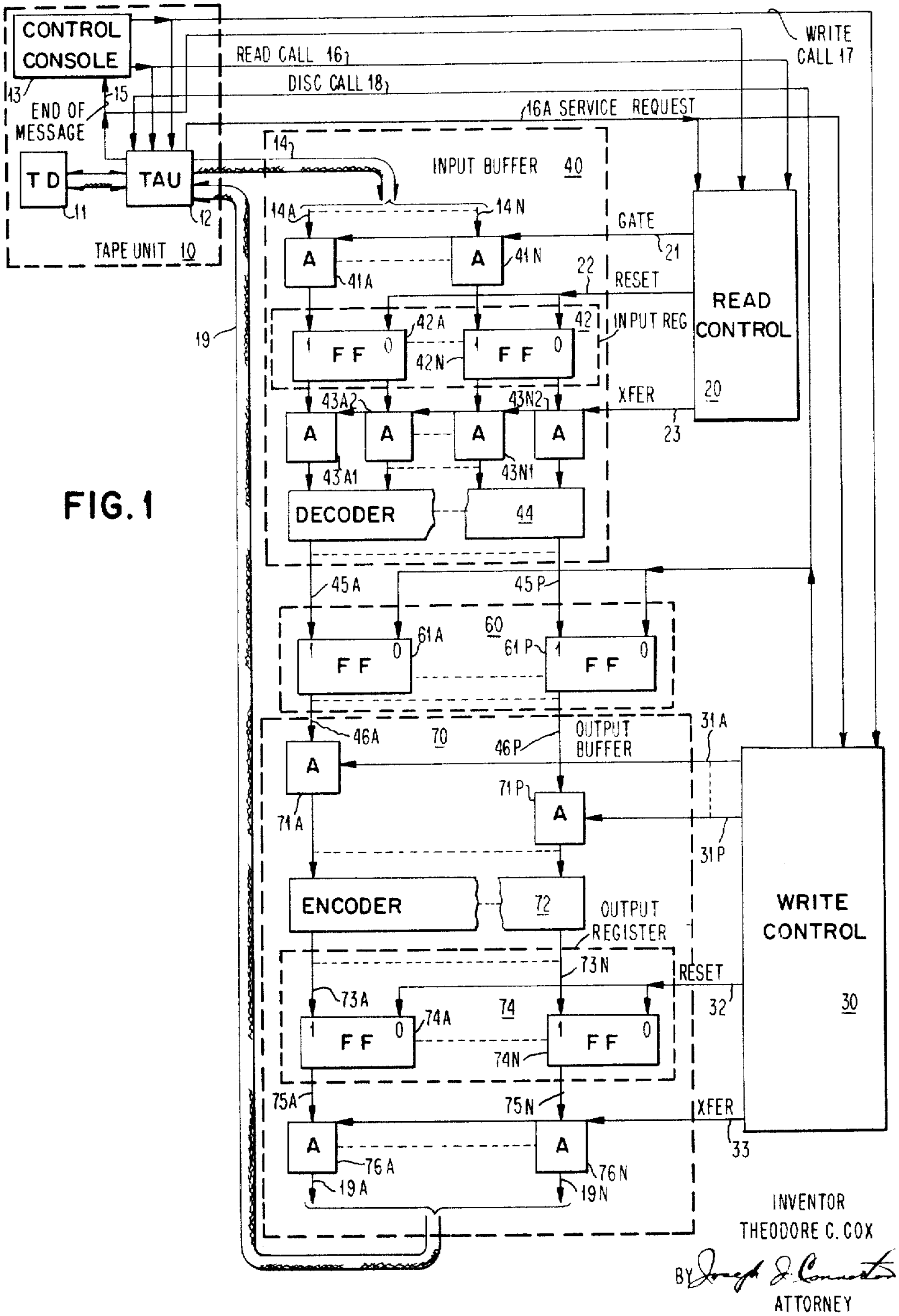
FIGURE 1 shows a block schematic diagram of a sorting system.

In the ensuing description and in the drawings, reference is made to logical devices of types well-known to and understood by those skilled in the art. In the drawings, logical devices are shown as labeled blocks; thus a block labeled A represents a logical And circuit, a block labeled FF represents a flip-flop, etc. Since these and the other elements employed in the preferred embodiment of this invention may comprise any suitable type of well-known element and do not constitute as such the present invention, a detailed description of these logical elements is not considered necessary to an understanding of the present invention.

Referring now to the drawings and more particularly to FIGURE 1, there is shown a generator 10 which on demand produces words on output conductors collectively indicated as cable 14, where each such word consists of signals representing binary 1's which appear on at least one or on a combination of lines 14 in substantial time coincidence. While word generator 10 may be of any of a number of commonly available types, preferably it is a magnetic tape unit manufactured by International Business Machines Corporation and identified as a Model 729 tape unit. Generator 10 (which is hereafter referred to as tape unit 10) includes tape drive 11, tape adapter unit 12 (hereinafter designated TAU 12) and a manually operable control console 13.

Tape unit 10 may be operated in a READ mode to retrieve words or characters on magnetic tape already loaded into tape drive 11 and fulfill the abovementioned function of a generator. Tape unit 10 also may be operated in WRITE mode in order to store on the tape words or characters presented serially to unit 10, and therewith fulfill an additional, independent final storage function. A READ or WRITE operation of unit 10 and the remainder of the presently considered system is started by operator manipulation of appropriate controls in control console 13.

At the outset of a READ mode operation, console 13 issues a signal to tape adapter unit 12 and to read control element 20 over READ CALL line 16. As a consequence, TAU 12 directs tape drive 11 to move the tape within drive unit 11 past the unit's transducer heads and otherwise causes characters magnetically recorded as binary bits on the tape and detected at the heads to be fetched on a parallel-by-bit basis. Each of the characters, which in the illustrated embodiment comprise six bits, are: (1) serially recorded along the length of the tape and (2) a part of the record to be sorted by the presently considered system. Tape adapter unit 12, upon receiving the bit signals which comprise the first and succeeding characters read from the tape, causes a signal to be issued over Service Request line 16A, and to transmit the bits of each character in parallel over output data lines shown collectively as 14. In the presently contemplated system, each binary "1" signal appearing on any one of lines 14 is indicated by a "up" voltage level, while a binary "0" on such a line is represented by the continued presence of the reference level voltage which normally is present on that line.

Tape unit 10 continues to produce words of the above-described characteristics on lines 14 until a so-called end-of-record gap (a space of defined minimum tape length in which no character is recorded) is detected by tape adapter unit 12 producing an end of message signal on line 15. Upon the detection of such a gap, unit 12 shuts down drive 11 and Read Control 20 terminates a READ mode operation when the end of message signal (on line 15) is received.

To start a WRITE mode operation, manipulation of console 13 controls causes console 13 to issue a signal over Write Call line 17 to tape adapter unit 12 and to Write Control 30. In response to this signal, unit 12 causes tape drive 11 to move the tape therein past the driver's transducer heads and otherwise prepares tape adapter unit 12 to accept and cause to be recorded (parallel by bit and serially by character) on the now-moving tape each of a series of characters, where the bits of each character correspond directly to one of the bit signals in a word represented by a signal appearing on at least one or a combination of the data input lines collectively indicated in the drawing as 19. The signal on line 17 also is effective to start the operation of write control 30. Tape unit 10 continues in write mode operation until a signal is received (from write control 30) of Disconnect Call line 18). The latter signal causes tape adapter unit 12 to stop tape drive 11 and otherwise shut down operations within tape unit 10.

Figure 2:
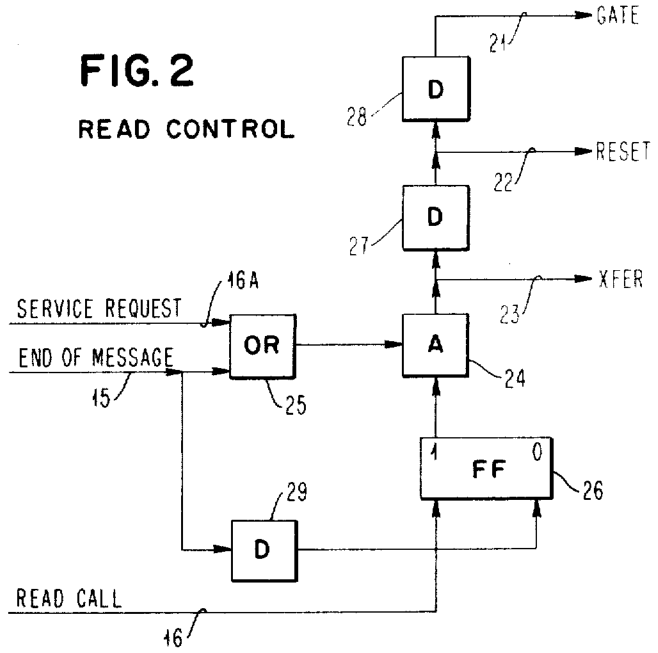
FIGURES 2 and 3 illustrate block schematic diagrams of a read control and a write control, respectively, in FIGURE 1.

*Read control 20.*—Before proceeding with a description of system operation, the operation of read control 20 and write control 30 are taken up. Turning first to read control 20, which is shown in FIGURE 2, sequence is initiated from control console 13 by a read call signal on line 16, which sets flip-flop 26 to the one state, thereby conditioning And circuit 24. The Read call signal is also applied to TAU 12 to start the tape in motion. TAU 12 generates a service request signal on line 16A when the first six bit character is available for transfer to input register 42. The signal is applied through logical Or circuit 25 to sample logical And circuit 24 to provide an output on line 23 labeled *Xfer*, which is more fully described hereinafter. The *Xfer* signal is delayed through delay unit 27 to provide the reset signal on line 22. The reset signal is then delayed along unit 28 to provide a gate signal on line 21. Delay units 27 and 28 function to ensure that reset and gate signals are generated in proper time sequence relative to the *Xfer* signal. After N service requests, the Nth word is stored in the input register 42, and an additional signal is required to transfer this word into storage register 60. The end of message signal is employed to accomplish this function. This signal on line 15 is applied to logical Or circuit 25, the output of which is used to control the transfer in the manner described above. The end of message signal is delayed through delay unit 29 to reset the flip-flop 26, the delay unit being used to ensure an output is provided from logical And circuit 24 before reset. Since the end of message signal also causes a Gate signal to be provided on line 21, it is assumed that the TAU 12 output at this time will be zero.

Figure 3:
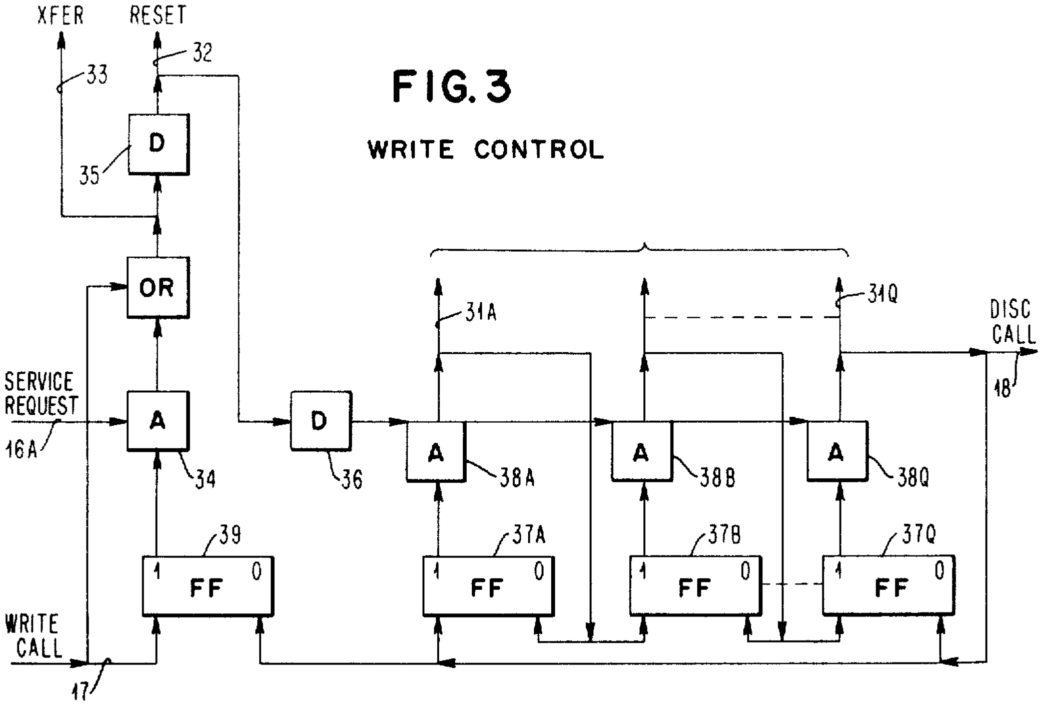

*Write control 30.*—Turning next to write control 30 which is shown in FIGURE 3, the appearance of a signal on Write Call line 17 from control console 13 is effective to set flip-flop 39 in its "1" state, therewith causing an output signal on the "1" side of the flip-flop which conditions And circuit 34. The write call signal on line 17 is also applied directly to delay unit 35 through a logical Or circuit to generate a transfer and reset signal and thereby ensure that the first selected value is encoded by encoder 72 (FIGURE 1) and stored in output register 74 (FIGURE 1) prior to the first service request. Thereafter, service request signals on line 16A passed through now-conditioned logical And circuit 34 and are applied to Transfer line 33 (for use in output buffer 70) and to delay unit 35, the output signals of which are applied to Reset line 32 and to the input of delay line 36. Thus, for each pulse produced on Transfer line 33, there is a corresponding delayed pulse appearing on line 32.

The output of delay line 36 is applied to the stepping input of a conventional ring counter which includes flip-flops 37A–37Q, as well as And circuits 38A–38Q. The ring counter is one stage longer than storage register 60 because it takes one write call signal and P Service Request signals to transfer P characters from storage register 60 to TAU 12. Assuming that flip-flop 37A already is in its "1" state at the time the first pulse is passed by delay line 36, and all other flip-flops in the counter are in "0" state, then the pulse applied to the counter's stepping input (the sampling inputs of all And circuits 38A–38Q) finds only circuit 38A conditioned. Consequently, only And circuit 38A is effective at this time to pass the stepping input pulse to its output. The output pulse from circuit 38A is applied to the "0" input of flip-flop 37A to reset that flip-flop to its "0" state and the "1" input of the next adjacent flip-flop 37B. The output signal of circuit 38A also is applied to line 31A which, with other lines in the group of 31A–31P, supply pulses in sequence to output buffer 70. The stepping operation of the ring counter is continued by the admission of each subsequent pulse through delay line 36 until the last pulse in the series finds And circuit 37Q in its conditioned state by virtue of flip-flop 37Q having been placed in its "1" state. The output signal produced by And circuit 38Q is applied: (1) to Disconnect Call line 18 (for transmission to tape adapter unit 12); (2) the reset input of flip-flop 37Q; (3) the "1" or set input of ring counter flip-flop 37A in order to set that flip-flop to its state; and (4) to the "0" or reset input of flip-flop 39 in order to reset that flip-flop to its normal "0" state. By resetting flip-flop 39 and therewith removing the conditioning signal from the "1" output of flip-flop 39, And circuit 34 is deconditioned to prevent the passage of further service request pulses to lines 32, 33 and 31A–31Q. From the description thus far, it is to be seen that for each pair of pulses produced on lines 32 and 33 a pulse is produced on one of lines 37A–37Q and that such pulses occur on lines 31A–31Q in the sequence (left to right) shown in FIGURE 3.

Referring back to FIGURE 1, when it is desired to sort into ordered sequence those words recorded as characters in random order along the length of the tape in unit 11, the system including tape unit 10 is made to operate first in READ mode to deliver the characters from TAU 12, the magnitudes of which vary in a random fashion, to buffer 40 for processing within the sorter. When the characters have been processed by the system, the system then is operated in WRITE mode to supply the characters in ordered sequence to a storage unit (in this case, tape unit 10). In the preferred embodiment of the invention, the order chosen is numerical.

With the system in READ mode, unit 10 is effective in the above-described manner to produce serially on data lines 14 the signal sets which represent characters and read control 20 is effective in the above-described manner: to place a gate signal on line 21 and to produce reset and transfer signals on lines 22 and 23 respectively. The signal on line 21 is effective to sample And circuits 41A–41N, so that signals appearing on any combination of input lines 14A–14N are admitted to the "1" inputs of appropriate flip-flops 42A–42N of input register 42. Upon the registration of bits of any word within register 42, the next-occurring signal on line 23 samples in parallel the conditions output And circuits 43A–43N (which collectively form an output for register 42), and causes those of the And circuits which have been conditioned by the flip-flops of register 42 to produce signals on the outputs thereof. The resulting set of output signals from And circuits 43A–43N are applied to the inputs of decoder 44.

Decoder 44 is of any of a number of commonly used and recognized types, and is effective to produce on a signal (i.e., a binary "1" bit) on one of its output lines 45A–45P. Decoder 44 is operative in response to the application of signals to each one of the possible combinations of the decoders input lines to place the output bit signal on the one of lines 45A–45P, the line so energized being selected in accordance with the identity of the combination of signals applied to the decoder inputs. At this point it is emphasized that the number of conductors 45A–45P is equal to the number of possible combinations of word values which may be expressed in input register 42 and the possible combinations of signals which may be generated on the outputs of And circuits 41A–41N. A character of six "0's" is not considered as a value in the embodiment shown in FIGURE 1, since such a value could not be distinguished from a reset indication.

From the description thus far it is to be seen that for each word produced during a read operation of tape unit 10, input buffer 40 is effective to produce a signal on one and only one of conductors 45A–45P, the one of these conductors being selected in accordance with the numerical value of the word bits received on lines 14. Output lines 45A–45P are arrayed relative to each other in order of regularly increasing numerical value to which the characters correspond. It is also to be seen that buffer 40 is effective to produce signals on appropriate lines 45A–45P as the continuing sequence of characters with randomly occurring magnitudes are produced by tape unit 10 and received at buffer 40.

Signals produced on output lines 45A–45P of buffer 40 are written into ordered binary elements of storage unit 60, each such element being effected in the well-known manner to change from its normal "0" state to its "1" state in response of the application of a signal to the so-called "1" input thereof from input buffer 40. In the preferred embodiment of the present invention, the elements in unit 60 are flip-flops 61A–61P. Each storage flip-flop corresponds in its ordered position to one of lines 45A–45P, and has its one input coupled to that line. For reasons established in the following part of this description, a signal has been applied to disconnect call line 18 prior to the presently considered read operation of the system, with the result that the flip-flops of storage element 60 have been cleared (reset to "0" state) prior to the receipt of the first word buffer 40. As a result, signals appearing during the read operation on output lines 45A–45P are effective to change only the appropriate flip-flops within unit 60 into their "1" states. The remainder of the flip-flops in element 60 remain in the "0" state. As a result, when the read operation is complete, those elements of 61A–61P which correspond to the values of words which have been received on input lines 14 are effective to produce signals on their one outputs, the position of the flip-flops in "1" state within element 60 being significant. Thus it is apparent that a single storage position is provided for each possible character value and the decoded value selects the appropriate storage position.

During the next described WRITE operation those words which have been produced in random order by tape unit 10 and transmitted to buffer 40 are to be reproduced in order to value. Write control 30 is effective during such an operation to produce sampling pulse signals in sequence on lines 31A–31P. Lines 31A–31P are connected to the stampling inputs of And circuits 71A–71P, respectively, of output buffer 70. From the previous description, it is to be recalled that for each signal produced on one of lines 31A–31P write control 30 also produces a first-occurring signal on X*fer* line 33 and a later-appearing signal on reset line 32. Upon the appearance of a signal on line 31A (the first of lines 31A–31P), the first of the above-described outputs 46A–46P of storage element 60 is sampled at And circuit 71A. If a bit representing a character of value corresponding to the position significance of flip-flop 61A has been stored within storage element 60, then a signal is present on the output 46A. Such a signal is effective to condition And circuit 71A, so that the sampling pulse appearing on line 31A causes a signal to appear on the output of circuit 71A. The sampling of each input And circuit 71A–71P of buffer 70 proceeds sequentially, and signals produced during this sampling operation are sequentially applied to the inputs of encoder 72 in the order in which they are generated.

Encoder 72 is provided with inputs equal in number to the number of possible values of words to be reconstructed and stored in unit 10. The outputs of And circuits 71A–71P are connected in sequential order of value to the inputs of encoder 72, which may be of any of a number of commercially accepted and recognized types. Encoder 72 is effective in response to the application of a signal to any one of its inputs to produce signals on that combination of its output lines 73A–73N which represent the character to be stored in unit 10, and which are the reproduction of a set of signals in a character previously received from tape unit 10 during the preceding READ operation. Such combinations of signals from encoder 72 are stored in appropriate flip-flops 74A and 74N of output register 74.

The signal which appears on reset line 32, which is coupled in parallel to the "0" inputs of all register 74 flip-flops, resets all flip-flops within register 74 to the "0" state, so that the register 74 flip-flops receive and express on their outputs the binary expression of each encoded word passed from encoder 72. After flip-flops 74A–74N have been selectively set in accordance with the signals appearing on conductors 73A–73N, each later-occurring signal on line 33 (which is coupled to the sampling inputs of And circuits 76A–76N) causes those of And circuits which are conditioned to produce on output lines 19A–19N a set of signals which is transmitted to the data input of tape adapter unit 12. During the presently considered WRITE operation, each set of character signals produced on lines 19A–19N (which now are in serial order of numerical value) are written onto the tape within unit 11 in the order in which they are received at tape unit 10.

As mentioned the description of write control 30 above, the end of the write operation is marked by the appearance of a signal on disconnect call line 18. In addition to its function of shutting down the operation of tape unit 10, the line 18 signal is applied to the "0" inputs of flip-flops within storage unit 60. Consequently, all information stored in element 60 is erased at this time, and the system is therewith placed in condition to carry out the next sorting operation.

*Summary*.—In the foregoing description, there has been described a system for sorting into order of value each of a plurality of characters issuing from a generator (tape unit 10). Each of these characters may have any one of a number of possible numerical values, and may be produced serially by the tape unit. A memory or storage unit (60) has been described, the unit including a plurality of bistable elements (flip-flops), each of which corresponds to and is used to represent a particular one of the various possible values of characters issuing from tape unit 10. These storage unit elements are arrayed in the order of the character values which they represent. Each element is operable to store a bit of information (binary "1" signal). In order to use the storage unit, character decoder 44, read control 20 and input buffer 40 are provided. These elements, particularly buffer 40, are coupled to the tape and operable in response to the receipt of each character from unit 10 for writing a binary "1" signal in the one of the storage unit elements which represents value of the received character. In this fashion, information bits representing the production of characters of particular values are stored in appropriate memory elements.

There also has been shown in the foregoing description scanning means (write control 30) examines serially by address the elements within the storage unit to determine whether or not each such element contains a binary "1." While the scanning means has been described in an ascending sequence in the preferred embodiment, it will be obvious to one skilled in the art that the scanning could be employed to provide any desired sequence of scanned values. This scanning means is effective in response to the detection of each binary "1" signal stored in the storage unit to generate an output signal. Encoding means comprising encoder 72 and output buffer 70 is coupled to the scanning means and to the storage unit and is responsive to each signal read from the storage unit to reproduce a character of value equal to the character represented by the identity of the element from which any such bit or signal has been read. The write control includes means operable upon completion of the reading of the memory elements to erase all bits or signals stored in the memory in preparation for a later sorting operation.

While the invention has been particularly shown and described with reference to a preferred embodiment thereof, it will be understood by those skilled in the art that the foregoing and other changes in form and details may be made herein without departing from the spirit and scope of the invention.

What is claimed is:

1. In a system for sorting into order of value each of a plurality of words which may have any one of a number of values and which are produced from a word generator, the combination comprising:

a storage device having a plurality of elements, said elements corresponding to the various possible values of said words and arrayed in the order of word values represented thereby, each of said elements being operable for storing a single bit of information, and decoding means coupled between said generator and said storage device responsive to each word received from said generator for writing a bit into the one of said storage elements representing the value of such a received word.

2. A system set forth in claim 1 further comprising reading means operative for examining by address within said storage device each of said elements and responsive to each bit previously stored therein to generate an output signal, and encoding means coupled to said reading means and said storage elements operative in response to each signal read from said storage device for reproducing a word having a value equal to the value of the word represented by the identity of said element from which such a bit has been read, whereby words originally produced by said generator are later reproduced by said encoding means.

3. In a system for sorting into order of value each of a plurality of words which may have any one of a number of values and which are serially produced in random order of value by a word generator, the combination comprising:

a storage device having a plurality of elements, said elements corresponding to and representative of the various possible values of said words arrayed in the order of word values represented thereby, each of said elements being operable for storing a single bit of information, and decoding means coupled to said generator operative in response to each of the series of words produced by said generator for writing a bit into the one of said memory elements representing the value of the received word, whereby a number of significant information bits representing each value of a plurality of words are stored in serial order within the appropriate storage elements to represent the identity or relative values of said words.

4. A system set forth in claim 3 and having in addition:

reading means serially operative for examining by address within said storage device the contents of each of said elements, and responsive to each bit previously stored therein to generate an output signal, and encoding means coupled to said reading means and said memory elements operative in response to each signal read from said memory for reproducing a word of value equal to the value of the word represented by the identity of said element from which such a bit has been read, whereby words originally produced by said generator are later derived serially in order of their relative values.

5. In a system for sorting into order of value each of a plurality of words which may have any one of a number of values and which are serially produced in random sequence by a word generator, the combination comprising:

a storage device comprising a plurality of bistable elements, said elements corresponding to and representing the various possible values of said words and arrayed in the order of word values represented thereby, each of said elements being operable for storing of binary one signals, decoding means coupled to said generator and operating in response to the receipt of each of said words for writing a binary one signal into the one of said elements representing the value of the received word, scanning means for examining serially by address the contents of each of said elements and responsive to each signal stored therein to generate on output signal, encoding means coupled to said scanning means and to said storage device responsive to each signal read from said storage device for reproducing a word of value equal to the value of the word represented by identity of said element from which any such bit has been read, and means operative upon the reading of said storage elements to erase bits stored in said storage, whereby words originally produced by said generator are later derived serially in order of their relative values, and said system is prepared for a subsequent sorting operation.

No references cited.

ROBERT C. BAILEY, *Primary Examiner.*

M. LISS, *Assistant Examiner.*